Jan. 23, 1940.  V. M. GILKERSON  2,188,221
ATTACHMENT FOR TRACTOR WHEELS
Filed Nov. 24, 1937
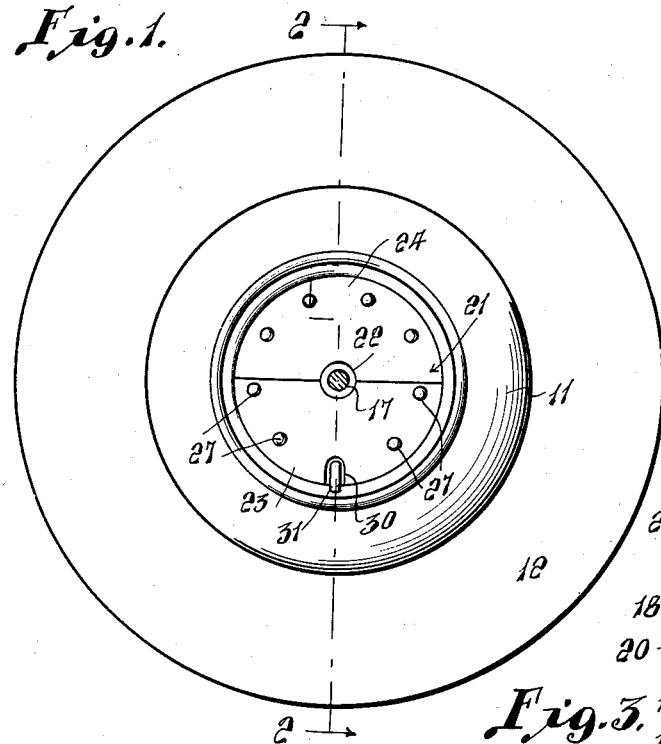
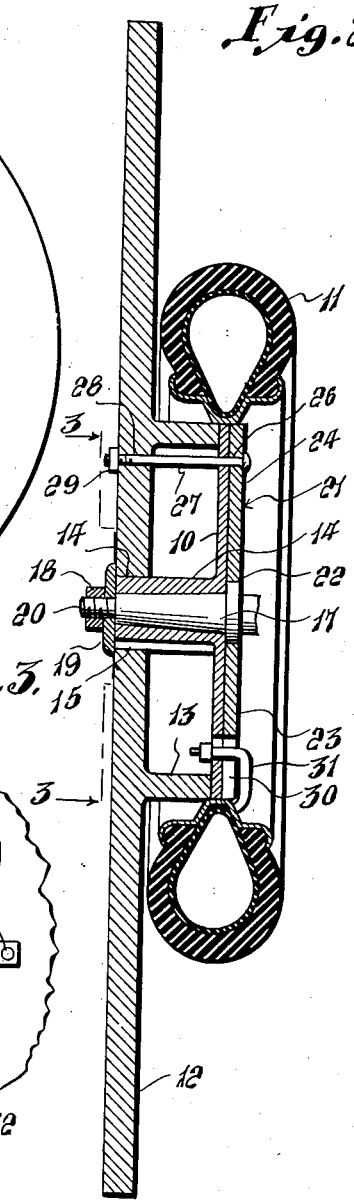
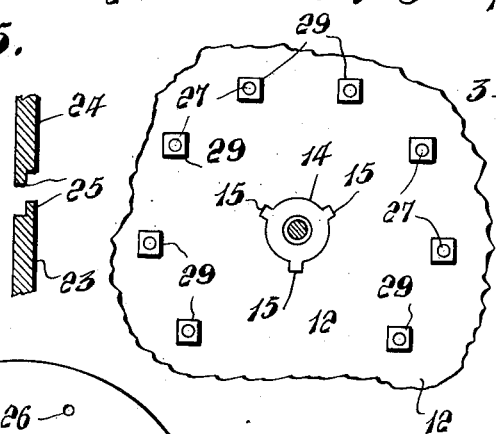
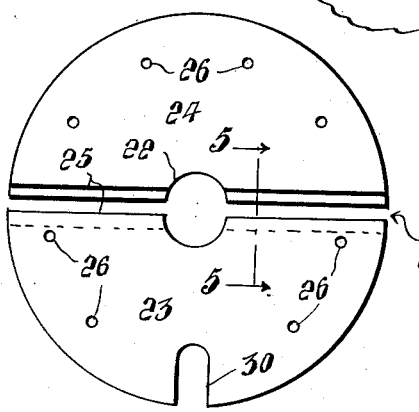
Inventor
V. M. Gilkerson
Attorney Patented Jan. 23, 1940

2,188,221

UNITED STATES PATENT OFFICE 2,188,221

ATTACHMENT FOR TRACTOR WHEELS

Vernon M. Gilkerson, Oakley, Kans.

Application November 24, 1937, Serial No. 176,368

2 Claims. (Cl. 301—38)

This invention relates to an attachment for tractor wheels adapted to prevent the wheels from sliding laterally.

An important object of this invention is to provide an attachment especially adapted for the front wheels of tractors, having pneumatic tires, to prevent the front wheels from sliding laterally when moving across an inclined surface.

Another object of the invention is to provide a disk mounted on one side of the tire, in spaced relationship thereto, to cut into the surface over which the wheel is moving to prevent lateral slippage of the wheel.

A further object of the invention is to provide means whereby the attachment may be readily applied or removed.

Other objects and advantages of the invention will hereinafter become more fully apparent from the following specification of which the drawing forms a part, and wherein—

Figure 1 is a side elevational view of the inside of a tractor wheel showing the attachment applied thereto, Figure 2 is a vertical sectional view on the line 2—2 of Figure 1, Figure 3 is a sectional view taken on the line 3—3 of Figure 2, Figure 4 is an enlarged view in side elevation of the attaching member formed of the corresponding sections, and Figure 5 is a sectional view on the line 5—5 of Figure 4.

Referring more particularly to the drawing wherein like reference characters designate like or corresponding parts throughout, 10 designates a front wheel of a conventional tractor having a pneumatic tire 11 mounted thereon.

A disk 12 which is of substantially greater circumference than tire 11 is provided with an annular flange 13, of substantially the same diameter as wheel 10, which extends outwardly from one side of disk 12 and which is adapted to engage against the outer side of the wheel 10 to hold disk 12 spaced from tire 11 as best seen in Figure 2.

Disk 12 is provided with a central opening 14 having the slots 15 extending therefrom. Opening 14 is adapted to receive the hub 16 of wheel 10 which encloses the end 17 of the axle on which hub 16 is mounted to rotate. Slots 15 are provided to accommodate the ribs which are formed on the hubs 16 of some of the conventional tractor wheels. A nut and washer 18 and 19 respectively engage the reduced threaded end 20 of axle 17 to assist in securing disk 12 in position.

A disk 21, provided with a central opening 22 and comprising the sections 23 and 24 having tongues 25 adapted to overlap and connect the sections 23 and 24, is mounted on the inside of wheel 10 with the opening 22 adapted to accommodate the axle 17. Disk 21 is of substantially the same diameter as wheel 10 and is provided with spaced openings 26 to receive the bolts 27 which extend through wheel 10 and the spaced openings 28 in disk 12. Nuts 29 are secured to the threaded ends of bolts 27 to secure disk 12 to disk 21 and wheel 10.

Section 23 is provided with a slot 30 to aline with an opening in wheel 10 through which the tire valve 31 extends.

From the foregoing it will be obvious that disk 12 can be removed by removing nuts and bolts 29 and 27, the sections 23 and 24, and the nut and washer 18 and 19. Disk 21 being formed of two sections permits the attachment to be quickly applied or removed without removing the wheel. With disk 12 in position the tractor may move crosswise of a field which is slippery without danger of the tires 11 sliding laterally since disk 12 will cut into the earth to resist any lateral movement. The disk 12 is spaced from tire 11 to allow it to flex under the tractor's weight. In passing over a hard surface the front wheels will ride on the edge of disk 12 so that a substantial connection such as described is necessary.

The attachment may be used on other vehicles besides tractors and may be used on rear wheels in some cases. The invention as illustrated is adapted to be attached to one particular commercially built tractor. Slight changes and modifications may be required to adapt the invention to other makes of tractors having differently shaped and sized wheels.

It is to be understood that various modifications and changes may be resorted to without departing from the spirit and scope of the invention.

I claim as my invention:

1. In combination with a wheel having a pneumatic tire, a disk provided with a central opening adapted to engage the hub of the wheel, an annular flange, formed integral with and projecting outwardly from one side of the disk, to engage the wheel to hold said disk in spaced relationship to the tire, a plate formed of corresponding sections adapted to be positioned on the opposite side of said wheel, and fastening means removably connecting the disk and plate to retain the parts in position on the wheel, said disk being of greater diameter than the tire to engage a supporting surface to prevent sidewise movement of the tire.

2. In combination with a wheel having a pneumatic tire, a disk having a plurality of openings, a flange extending from one side of said disk adapted to engage the wheel to hold the disk in spaced relationship to the tire, a disk formed of corresponding sections for engaging the opposite side of the wheel and provided with a plurality of openings, and fastenings extending through the openings in said sections and in the first mentioned disk and through the wheel to secure said first mentioned disk to the wheel, said first mentioned disk being of a greater diameter than the tire to engage the earth to prevent lateral slippage of the tire.

VERNON M. GILKERSON.